Aug. 9, 1960   J. ASTL   2,948,151
DIFFERENTIAL PRESSURE GAUGE
Filed Dec. 12, 1958   2 Sheets-Sheet 1

INVENTOR.
JAROMIR ASTL
BY Knox & Knox

INVENTOR.
JAROMIR ASTL
BY Knox & Knox

United States Patent Office 2,948,151
Patented Aug. 9, 1960

2,948,151

DIFFERENTIAL PRESSURE GAUGE

Jaromir Astl, 4053 Alameda Drive, San Diego, Calif.

Filed Dec. 12, 1958, Ser. No. 779,910

3 Claims. (Cl. 73—406)

The present invention relates generally to pressure indicators and more particularly to a differential pressure gauge.

The primary object of this invention is to provide a pressure gauge which provides indication of a maximum pressure differential between two points in a fluid system, the instrument being completely sealed and leak-proof, although having an easily readable calibrated indicator.

Another object of this invention is to provide a pressure differential gauge in which the indicator is free of all mechanical connection with the pressure sensing mechanism, which is enclosed in a sealed unit.

Another object of this invention is to provide a pressure differential gauge in which the indicator remains at the maximum reading until intentionally reset.

A further object of this invention is to provide a differential pressure gauge which may be mounted in any convenient position, the mechanism not being sensitive to a particular orientation.

Finally, it is an object to provide a differential pressure gauge of the aforementioned character which is simple, safe and convenient to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Similar characters of reference indicate similar or identical elements and portions throughout the specification and throughout the views of the drawings.

Figure 1:
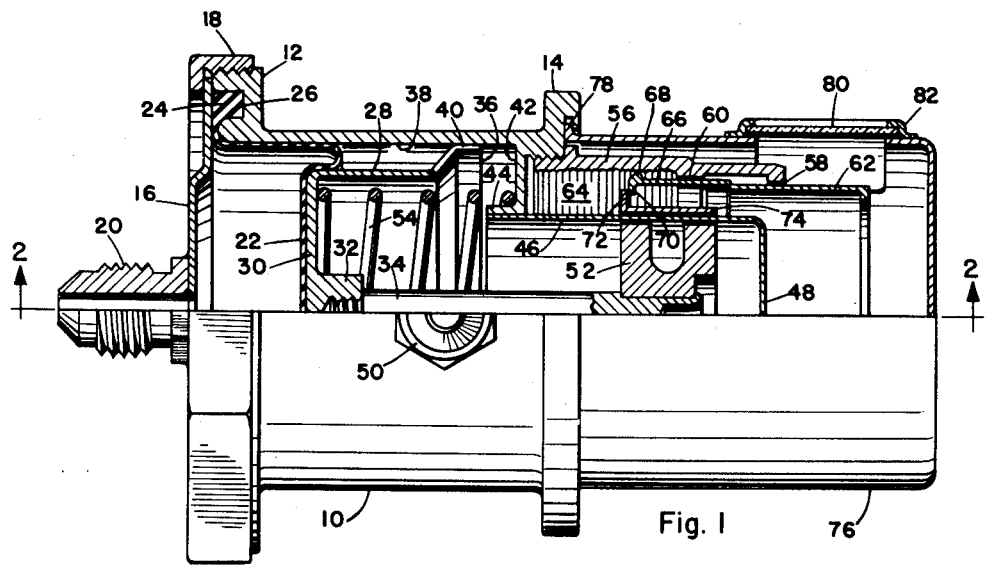
Figure 1 is a top plan view, half in section, of the pressure gauge.

Referring now to the drawings in detail, the gauge comprises a generally cylindrical casing of body 10 having a large radially extending flange 12 at one end and a smaller flange 14 at the other end thereof. One end of the body 10 is closed by a cover plate 16 resting on the flange 12 and held in place by a retaining ring 18, screw threaded or otherwise secured to said flange, and fixed centrally on the outside of the cover plate is a standard hose fitting serving as a high pressure inlet 20. Clamped between the cover plate 16 and the flange 12 is a flexible diaphragm 22 having a thickened rim 24 which seats in an annular groove 26 in said flange. Within the body 10 is a hollow, cylindrical piston 28 having a generally flat closed end 30 which is attached to the diaphragm 22, said closed end having a central internal boss 32 into which is secured one end of an axially extending piston rod 34. The open end of the piston has an enlarged diameter end rim 36 which is a close sliding fit within the internal bore 38 of the body 10, said end rim having notches 40 therein to provide resiliency.

The end of the body 10 adjacent the flange 14 has a transverse wall 42 in which is a central collar 44, and fixed into said collar is an axially extending, cylindrically extension chamber 46 having a closed outer end 48. The extension chamber 46 is a continuation of the body 10 and is sealed thereto to prevent leakage of any fluid. The body 10 itself has a low pressure inlet 50 adjacent the flange 14, said inlet being a standard type hose fitting. The piston rod 34 extends axially into the extension chamber 46 and secured to the end of the piston rod is a generally disc shaped magnet 52, which is shown slotted in various places for lightness, although the exact configuration is not critical. The piston 28 is biased toward the high pressure inlet 20 by a coil spring 54, fitted around the piston rod 34 between the closed end 30 and the wall 42.

Fixed into the body 10 and extending axially outwardly from the wall 42 is a cylindrical guide sleeve 56, having an inwardly turned bearing ring 58 at its outer end and a second bearing ring 60 spaced inwardly from and concentric with the first bearing ring. Mounted in the guide sleeve 56 is an axially slidable calibrated indicator sleeve 62, which is a smooth sliding fit in the bearing rings 58 and 60. The inner surface of the guide sleeve 56, between the wall 42 and the bearing ring 60, has a plurality of axially spaced, annular serrations 64, the serrations being very fine and for the purpose of providing friction. The inner end of the dial sleeve 62 has a plurality of axially extending resilient tongues 66, each of which has an outwardly protruding bearing tip 68 frictionally bearing on the serrations 64. In this manner, undesirable free movement of the calibrated indicator sleeve 62 is prevented. The tip of each tongue 66 also has a radially inwardly projecting lug 70, the lugs being engaged by the outwardly extending driving flange 72 of a clutch collar 74, which is axially slidably mounted on the extension chamber 46. The clutch collar 74 is made from ferromagnetic material and, other than the magnet 52 itself, is the only magnetic material in the entire assembly, to prevent interference or binding of the moving parts. The clutch collar 74 engages the inner faces of the lugs 70 and moves the calibrated indicator sleeve 62 in an outward direction only.

Figure 3:
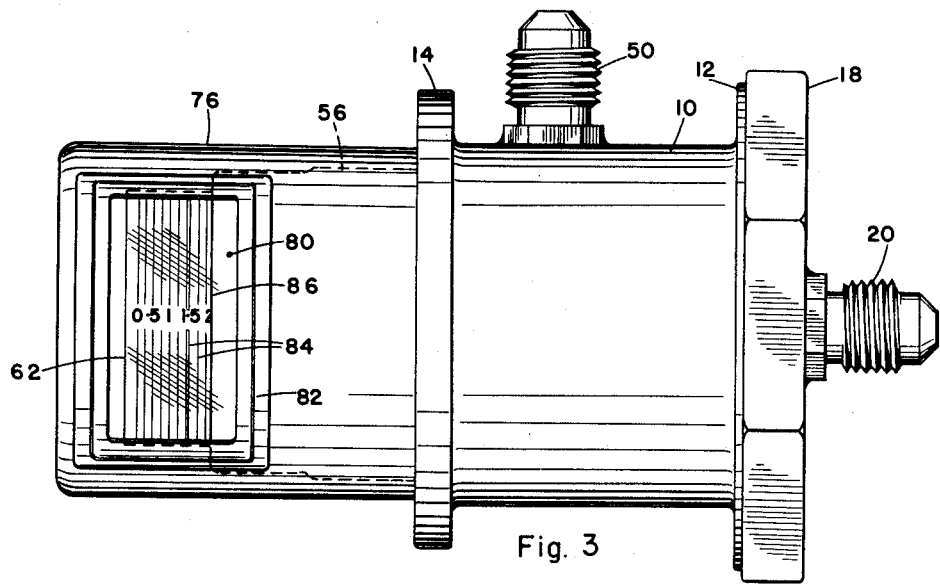
Figure 3 is a side elevation view of the gauge, shown reversed from the position in Figure 2.
Figures 4, 5:
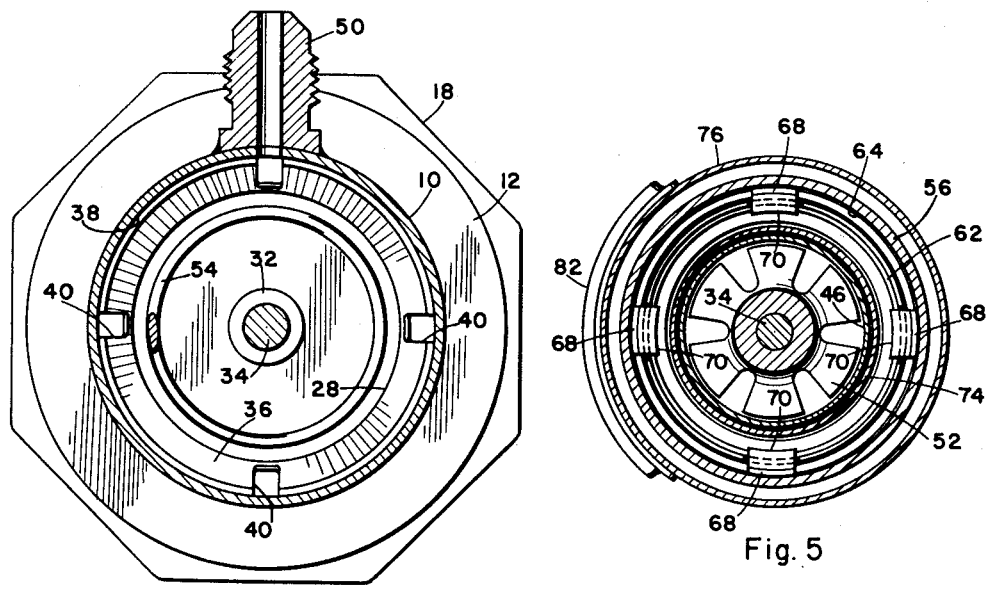
Figure 4 is a sectional view taken on the line 4—4 of Figure 2.
Figure 5 is a sectional view taken on the line 5—5 of Figure 2.

To protect the calibrated indicator sleeve 62, a closed cylindrical cover 76 is fitted over the guide sleeve 56, said cover being removably secured to the flange 14 by a conventional twist lock thread 78, or other such easily detachable means. The cover 76 is fitted with a suitable transparent window 80, mounted in a frame 82, for viewing the calibrated indicator sleeve 62 which is suitably graduated in axially spaced increments, as indicated at 84 in Figure 3. The end edge of the guide sleeve 56 serves as the reference plane 86 for reading the calibrated indicator sleeve 62.

Figure 2:
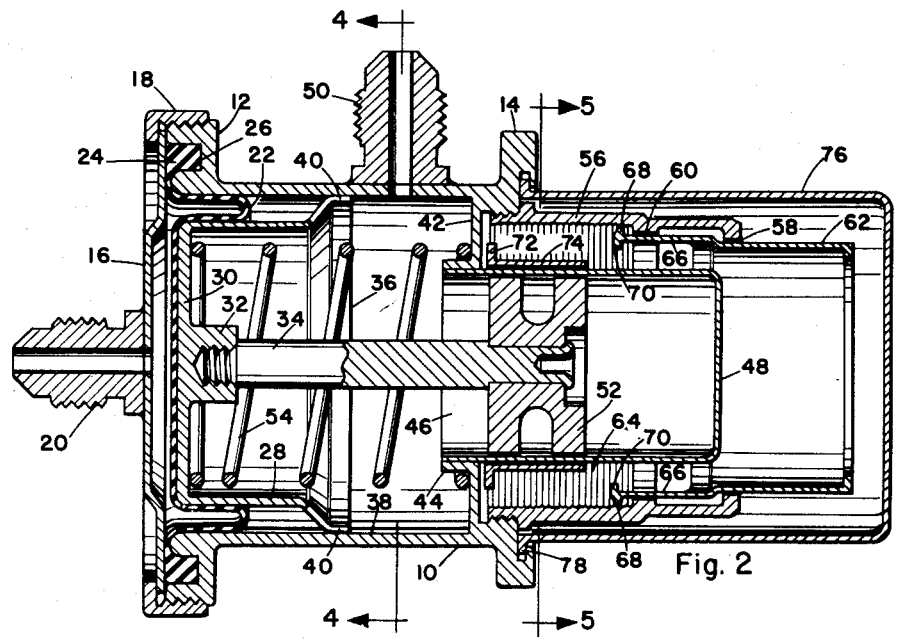
Figure 2 is a sectional view taken on the line 2—2 of Figure 1, with the piston axially displaced from the Figure 1 position.

The gauge is used to indicate a pressure differential between two points in a fluid system. One particular use for the gauge would be to indicate the pressure drop through a fuel filter, in which an excess pressure drop would denote clogging or other such malfunction in the filter. In any event, the higher pressure side of the fluid system is connected to the high pressure inlet 20, while the lower pressure side is connected to the low pressure inlet 50. The high pressure acting against the diaphragm 22 forces the piston 28 toward the low pressure inlet 50 until the bias of the spring 54 balances the pressures. As the piston moves, the magnet 52 advances into the extension chamber 46 and carries the clutch collar 74 along with it, as in Figure 1, the magnetic field being effective through the wall of the extension chamber. When the high pressure drops or the lower pressure increases, thus decreasing the pressure differential, the spring 54 urges the piston 28 back and withdraws the magnet 52. The clutch collar 74 is withdrawn by the magnet 52 but the dial sleeve 62 remains fixed at the position of greatest extension, retained by the friction of the bearing tips 68 on the serrations 64, as in Figure 2. The maximum pressure differential can be read directly through the window 80, as in Figure 3. The calibrated indicator sleeve 62 is reset to zero manually and is accessible by removing the cover 76. For frequent use, in installations where the extended dial sleeve is not likely to be damaged or interfered with, the cover 76 may be left off for convenience.

All moving parts of the unit are substantially symmetrical and easily balanced for smoothness of operation. The gauge is not sensitive to orientation and may be mounted in any convenient position, the mass and inertia of the moving parts being negligible.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting. For example, means could be provided for changing linear motion of magnet 52 into angular motion, and the inclusion of an electric coil on the outside of cylindrical extension chamber 46 in order to provide remote resolving of movement of the magnet.

I claim:

1. A differential pressure gauge, comprising: a hollow body having a high pressure inlet and a low pressure inlet; a piston axially slidably mounted in said body between said inlets; a spring mounted between said piston and said body to bias the piston toward said high pressure inlet; said body having a closed, axially extended portion; a magnet fixedly connected to said piston and axially movable in said extended portion; a clutch collar comprising magnetic material and disposed externally of and concentric with said extended portion to move axially in response to movement of said magnet in said extended portion; a bearing sleeve fixed at one end to said body coaxially with said extended portion; an indicator sleeve axially slidably mounted in said bearing sleeve; said clutch collar having a flange engageable with one end of said indicator sleeve to shift the same in one direction.

2. A differential pressure gauge, comprising: a hollow body having a high pressure inlet and a low pressure inlet; a piston axially slidably mounted in said body between said inlets; a spring mounted between said piston and said body to bias the piston toward said high pressure inlet; said body having a closed, axially extended portion; a magnet fixedly connected to said piston and axially movable in said extended portion; a clutch collar comprising magnetic material and disposed externally of and concentric with said extended portion to move axially in response to movement of said magnet in said extended portion; a bearing sleeve fixed at one end to said body coaxially with said extended portion; an indicator sleeve axially slidably mounted in said bearing sleeve; said bearing sleeve having axially spaced, internal serrations; said indicator sleeve having resilient, axially extending means engageable with said serrations; said clutch collar having a radially extending portion engageable with said means to shift said indicator sleeve in one direction.

3. A differential pressure gauge, comprising: a hollow body having a high pressure inlet and a low pressure inlet; a piston axially slidably mounted in said body between said inlets; a spring mounted between said piston and said body to bias the piston toward said high pressure inlet; said body having a closed, axially extended portion; a magnet fixedly connected to said piston and axially movable in said extended portion; a clutch collar comprising magnetic material and disposed externally of and concentric with said extended portion to move axially in response to movement of said magnet in said extended portion; a bearing sleeve fixed at one end to said body coaxially with said extended portion; an indicator sleeve axially slidably mounted in said bearing sleeve; said bearing sleeve having axially spaced, internal serrations; said indicator sleeve having resilient, axially extending tongues; the ends of said tongues being frictionally engageable with said serrations; said clutch collar having a radially extending flange engageable with the ends of said tongues to shift said indicator sleeve in one direction; said indicator sleeve having axially spaced external demarcations thereon in increments of pressure; the other end of said bearing sleeve constituting a reference plane for reading said demarcations.

References Cited in the file of this patent

UNITED STATES PATENTS

| | | |
|---|---|---|
| 2,816,439 | Hayes | Dec. 17, 1957 |
| 2,824,186 | Binford | Feb. 18, 1958 |

FOREIGN PATENTS

| | | |
|---|---|---|
| 213,449 | Switzerland | May 1, 1941 |